Sept. 26, 1961     H. MULCH ET AL     3,001,445
SLIDE PROJECTOR
Filed Oct. 26, 1959                         2 Sheets-Sheet 1
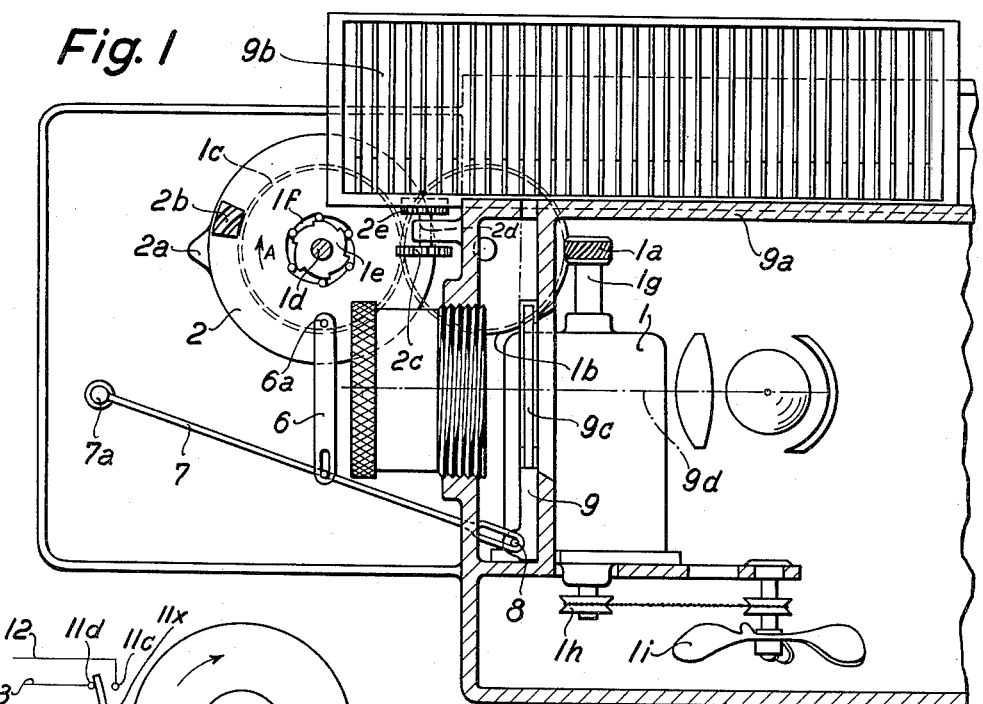
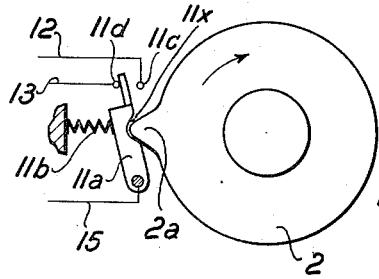
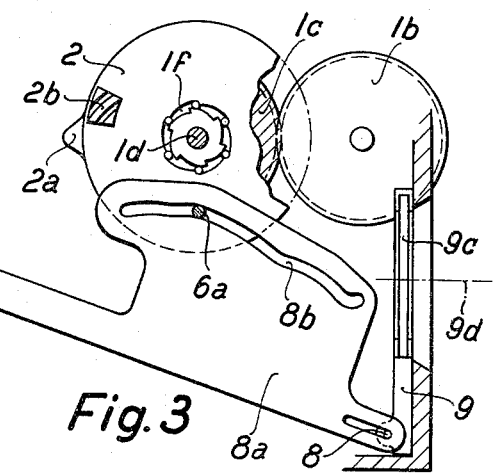
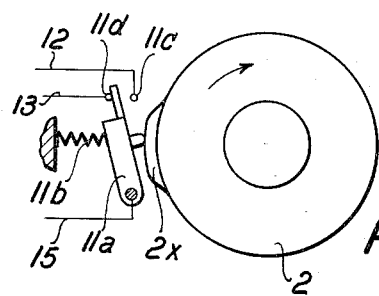
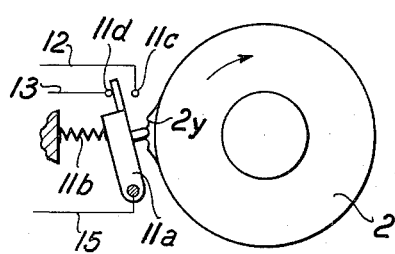
INVENTORS
HANS MULCH
DIETER NISSEL
BY *Toulmin & Toulmin*
ATTORNEYS Sept. 26, 1961     H. MULCH ET AL     3,001,445
SLIDE PROJECTOR Filed Oct. 26, 1959                                       2 Sheets-Sheet 2

INVENTORS
HANS MULCH
DIETER NISSEL
BY Toulmin & Toulmin
ATTORNEYS

United States Patent Office 3,001,445
Patented Sept. 26, 1961

3,001,445
SLIDE PROJECTOR
Hans Mulch and Dieter Nissel, Wetzlar (Lahn), Germany, assignors to Ernst Leitz Gesellschaft mit beschränkter Haftung, Wetzlar (Lahn), Germany
Filed Oct. 26, 1959, Ser. No. 848,749
Claims priority, application Germany Oct. 30, 1958
7 Claims. (Cl. 88—28)

The present invention relates to an improved slide projector with cooling means and electro-mechanical slide changing means. More in particular, the present invention relates to a slide projector with cooling means and electro-mechanical slide changing means of the general type described in the co-pending patent application Serial No. 754,809, filed August 13, 1958, and assigned to the same assignee as the present application.

The co-pending application describes a projector for slides or transparencies comprising electro-mechanical switch and transmission means, a motor and a clutch which drives in only one direction of rotation. The motor can be operated for clockwise as well as counter-clockwise rotation and drives the ventilator or cooling means as well as the electro-mechanical transmission means for exchanging a slide. The projector is adapted to perform a full as well as a partial exchanging operation. By a full exchanging operation a slide is removed from the projecting position, the magazine is conveyed by the distance of one slide and a new slide is moved to the projecting position. By a partial exchanging operation a slide is removed from the projecting position whereas the magazine remains in its previous position. The projector is further equipped with two separate electric switches for each of the afore-mentioned different operations. As described in the application supra, the switches can be remotely controlled.

Furthermore, the transmission means for displacing the slide comprise a push rod connected with the driven disk of the clutch means, which disk is provided with a cam. The cam actuates a pair of switches which are spaced with respect to each other by 180 degrees which, in turn, control the rotation of the driven disk impelled by the motor, by 180 or 360 degrees. A full rotation of the driven disk by 360 degrees effects the afore-mentioned complete exchange, whereas a rotation by 180 degrees results in the partial exchange.

It has been found that the structure and operation of such a projector can be further improved by providing only one instead of two switches for initiating, at will, either a complete slide exchange or a partial exchange following a rotation of the driven disk by 180 or 360 degrees, respectively.

It is, therefore, the object of the present invention to provide a projector with cooling means and an electro-mechanical, remote-controlled slide changing mechanism adapted to effect, at will, a complete or a partial slide changing operation, and particularly a projector of the general type as described in the co-pending application, supra, in which either one of the afore-mentioned different operations can be effected by only one switch.

This object is achieved by the present invention wherein the projector of the general type referred to above comprises a pair of switches actuated by a cam mounted on the driven disk of the clutch means and having contact levers, each cooperating with a contact point of a manually operable reversing switch. The reversing switch is connected with the electric motor which latter has electric terminal points for clockwise and counter-clockwise rotation. Each of the terminal points of the electric motor is connected with one of the fixed contact points of the switches.

The reversing switch can be constructed as a spring-connected push button switch and it is connected with the other electric switch members of the projector by means of a remote-control cable. The main switch for the current supply is disposed in the electric line between the switch contact of the reversing switch and the motor terminal. This main switch for the current supply can also be connected with the electric switch members of the projector by means of a remote-control cable, preferably together with the cable for the reversing switch. The switches controlled by the cam of the driven disk of the clutch have moveable contact springs which are resiliently positioned against stationary contacts. Against the influence of the springs these contacts can be connected with the operating contact by means of the cam of the driven disk. The two stationary contacts are connected with the terminal point for the clockwise rotation of the motor, whereas the two operating contacts are connected with the terminal point for the counter-clockwise rotation of the electric motor. Furthermore, the two switches are spaced with respect to each other by 180 degrees corresponding to the respective end positions of the slide conveyor which latter is gear-connected with the driven disk of the clutch.

According to a further improvement according to the invention there is provided a safety switch adapted for interrupting the electro-mechanical control in case of a disturbance or in order to enable a manual operation of the projector.

The invention will be more fully appreciated upon the following description of the accompanying drawings, wherein FIGURE 1 is a side view, partly in section, of part of a projector showing the slide changing means of the invention;

FIGURE 3 is a plan view of the transmission means between the driving means and the slide conveyor of the slide exchanging mechanism in the projector of the invention;

FIGURES 4 through 6 are plan views illustrating various embodiments of the clutch means used according to the present invention.

Figure 2:
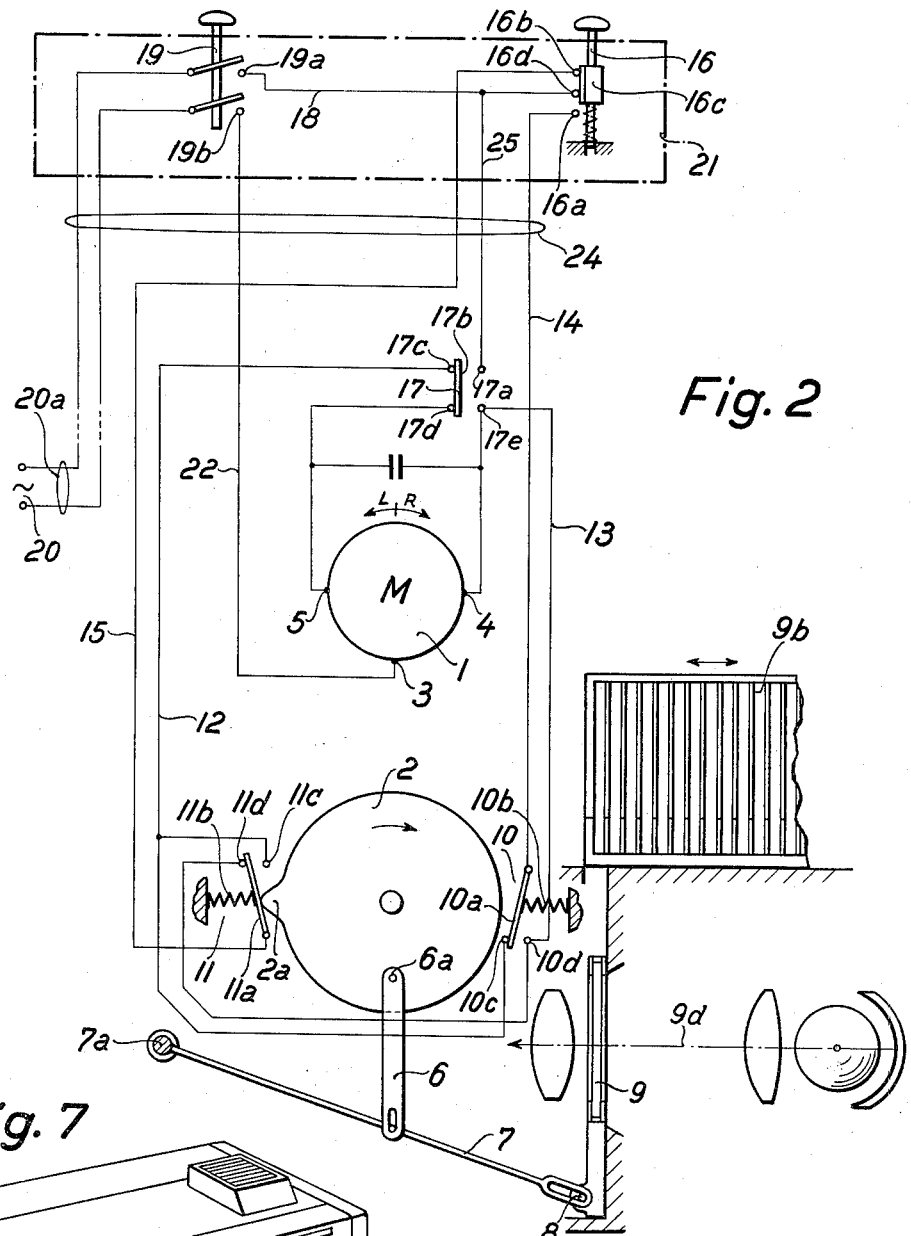
FIGURE 2 is a wiring diagram illustrating the circuit for actuating the slide changing mechanism in the projector of the invention.

Referring now to the drawings more in detail the slide projector comprises an electric motor 1 having a shaft 1g projecting at either side and bearing on one end a driving gear 1a, and, on the opposite end, a driving wheel 1h operating a ventilator 1i. The driving gear 1a engages a transmission gear 1b, which latter is in mesh with a gear 1c mounted upon shaft 1d. Shaft 1d also supports a disk 1e of a clutch 1f which drives in only one direction of rotation a driven disk 2. In the structure shown in the drawings, disk 2 is driven only by the clockwise rotation of disk 1e, as indicated by arrow A. On the driven disk 2 is mounted a control member 2b. In a predetermined position of driven disk 2 this control member 2b engages a gear 2c and step-switches the same. A further gear 2e is mounted on shaft 2d of gear 2c. The gear 2e engages the sack 9a of magazine 9b.

The motor 1 can be operated to turn in the clockwise as well as the counter-clockwise sense. For this purpose it has, in addition to its main terminal 3 two further terminals 4 and 5. (See FIGURE 2.) Terminal 5 is used for operating the motor in the clockwise sense, whereas terminal 4 is employed for turning the motor in the counter-clockwise sense of rotation.

During the clockwise rotation of motor 1 driven disk 1f is impelled and conveys the magazine via switch element 2b. At the same time disk 1f drives a push rod 6 pivoted about pivot 6a and connected with rod 7 pivoted at 7a. Rod 7 is connected with the slide conveyor 9 via joint 8. After a full revolution of disk 2, the slide 9a is removed in a known manner from the projecting position across optical axis 9d into the magazine 9b, whereupon the magazine is moved by the distance corresponding to one slide, and a new slide is moved to the projecting position in the path of rays defined by optical axis 9d.

Instead of the rods 6 and 7 and the joint 8 it is also possible to employ a lever 8a provided with a curved portion 8b, as shown in FIGURE 3.

The electric switch members for controlling the operation of motor 1 are shown in FIGURE 2. The driven disk 2, which can be rotated in the clockwise sense only, bears a cam 2a which is spaced with respect to pivot 6a by 90°. The cam actuates two oppositely disposed switches 10 and 11. The switches comprise movable contact blades 10a and 11a, springs 10b and 11b, fixed contacts for clockwise rotation 10c, 11c, and fixed contacts for counter-clockwise rotation 10d and 11d.

Furthermore, there is provided a reversing switch comprising actuating means such as, e.g., a spring actuated push button 16, a first contact 16a and a second contact 16b, a slide element 16c, as well as a switch contact 16d.

A further switch 17 comprises a movable switch blade 17b, a first pair of fixed contacts 17c, 17d, and a second pair of fixed contacts 17a, 17e.

The main switch of the control circuitry comprises an actuating member, e.g. a push button 19 with a pair of contact blades, and two contact points 19a and 19b.

The current source is designated with numeral 20.

Figure 7:
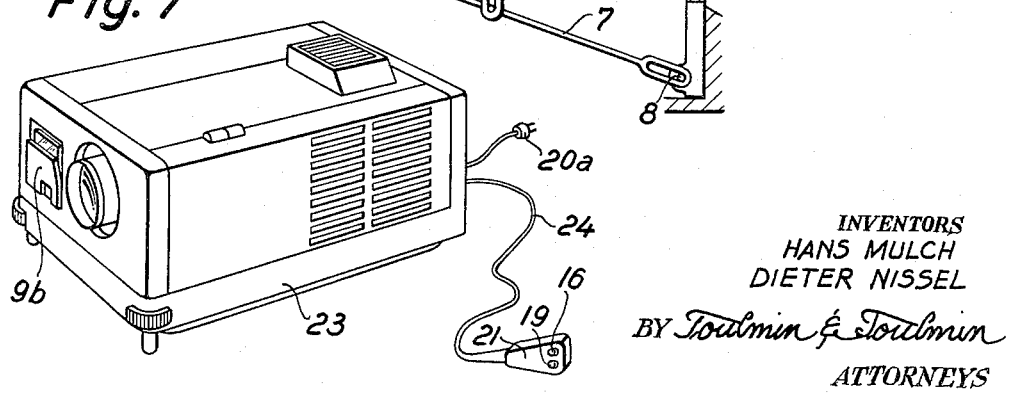
FIGURE 7 is a perspective view of the projector equipped with the remote control switch of the present invention.

The movable contact blades 10a and 11a of the first and second switches 10 and 11, respectively, are pressed by springs 10b and 11b against the first fixed contacts 10c and 11c for clockwise rotation, the opposite, second fixed contacts 10d and 11d being used for a counter-clockwise rotation. The first fixed contacts 10c and 11c are connected with line 12 to the contact terminal 5 for clockwise rotation of motor 1. The second fixed contacts 10d and 11d are connected by line 13 to the contact terminal 4 for counter-clockwise rotation of motor 1. Contact blade 10a is connected via line 14 to contact 16a of reversing switch 16, and contact blade 11a is connected via line 15 to the second contact 16b of reversing switch 16. The slide element 16c of the spring-actuated push button 16 contacts, in its resting position, the second contact point 16b and switch contact 16d. The switch contact 16d is connected with contact point 17a of switch 17, and line 18, as well as contact point 19a of main switch 19. The main switch 19 is used for connecting the current source 20 with the circuit system. The current source can be connected directly with the projector 23 via cable 20a (see FIGURE 7). Contact point 19b of main switch 19 is connected with the main terminal 3 of electric motor 1 via line 22. The two switches 16 and 19 can be provided directly at the projector 23 or they can be provided in a remote control box 21 as shown in FIGURE 7. The remote control box 21 is connected with the projector 23 by cable 24.

The switch 17 is used for interrupting line 12 and establishing a direct connection between contact terminal 4 of motor 1 and contact 19a of main switch 19. This is effected by displacing the moveable contact blade 17b from contacts 17c, 17d, to the contacts 17e, 17a.

The control circuitry for the projector according to the invention comprises five circuits which are hereinafter referred to as circuit I; circuit II; circuit III; circuit IV; and circuit V.

In circuit I the current passes from current source 20 through main switch 19, contact 19b, line 22, main terminal 3 of motor 1, motor 1, which latter is turned counter-clockwise, contact terminal 4, contact point 17e of switch 17, line 13, the second fixed contact 11d and contact blade 11a of second switch 11, line 15, the second contact point 16b, slide member 16c, and switch contact 16d of reversing switch 16, line 25, contact point 17a, line 18, contact point 19a, and switch 19 back to current source 20.

In circuit II the current passes from current source 20 through main switch 19, contact point 19b, line 22, main terminal 3 of motor 1, motor 1 which latter turns clockwise, contact terminal 5, contact point 17d, contact blade 17b and contact point 17c of switch 17, line 12, the first fixed contact point 11c and contact blade 11a of second switch 11, line 15, contact point 16b, slide element 16c and contact point 16d of reversing switch 16, line 18, contact point 19a and switch 19 back to current source 20.

In circuit III the current passes from current source 20 through main switch 19, contact 19b, line 22, main terminal 3 of motor 1, motor 1 which turns clockwise, contact terminal 5, contact point 17d, contact blade 17 and contact point 17c, line 12, the first fixed contact point 10c and contact blade 10a of first switch 10, line 14, first contact point 16a, slide member 16c, and switch contact 16d of reversing switch 16, line 18, contact point 19a and switch 19 back to current source 20.

In circuit IV the current passes from current source 20 through main switch 19, contact 19b, line 22, main terminal 3 of electric motor 1, motor 1 which then turns counter-clockwise, contact terminal 4, contact point 17e, line 13, the second fixed contact point 10d and contact blade 10a of first switch 10, line 14, first contact point 16a, slide member 16c and switch contact 16d of reversing switch 16, line 18, contact point 19a and switch 19, back to current source 20.

In circuit V the current passes from current source 20 through main switch 19, contact 19b, line 22, main terminal 3 of electric motor 1, motor 1 which is turned counter-clockwise, contact terminal 4, contact point 17e, contact blade 17b, and contact 17a of switch 17, line 18, contact point 19a and switch 19, back to current source 20.

The operation is as follows: By actuating switch 19 circuit I is closed and motor 1 is supplied with current from current source 20, whereupon it starts in counter-clockwise direction. Since the driven disk 2 of clutch 1f is impelled only in the clockwise sense of rotation, it is not turned and, consequently, none of the elements of the slide change mechanism is moved. Motor 1 thus drives only the ventilator 1i via shaft 1g and wheel 1h.

If it so happens that cam 2a of driven disc 2 is in a position different from that shown in FIGURE 2, circuit II is closed by actuating the main switch 19. Consequently, the motor starts to move in a clockwise sense of rotation. However, as soon as cam 2a of disk 2 comes into contact with contact blade 11a of switch 11, the blade is pressed, contrary to the influence of spring 11b, against contact point 11d. Thereby, circuit I is closed and the motor starts to revolve in counter-clockwise direction.

During this change of the sense of revolution of motor 1 the driven disk 2 which had been impelled during the brief clockwise rotation of motor 1 as long as circuit I had been closed the driven disk 2 must be stopped as quickly as possible. For that reason means are provided preventing disk 2 from continuing to move beyond the position of contact with blade 11a. As shown, for example, in FIGURE 4, the contact blade 11a has a recess 11 adapted to receive cam 2a, thereby braking driven disk 2. It is also possible to provide an elongated cam 2, as shown in FIGURE 5, or a cam with a rough surface 2y, as shown in FIGURE 6.

The brief rotation of cam disk 2 adjusting its position in the aforementioned manner simultaneously adjusts levers 6 and 7 and the slide conveyor into the required projecting position. This position corresponds to the initial position for effecting a complete change of slides.

A slide exchange is effected in the following manner: The magazine is placed into its guide in a known manner. Thereafter, the motor is started by actuating main switch 19 and causing it to revolve in counter-clockwise direction, or, if the cam is not in the aforementioned proper position, causing it to turn briefly in clockwise direction, as described above. In either instance, the motor finally turns in counterclockwise direction without impelling disk 2. Now, switch button 16 on the remote control box 21 is pressed and circuit III is closed, thereby reversing the sense of revolution of motor 1 and impelling disk 2.

Immediately after disk 2 has started to turn, cam 2a of the driven disk 2 comes out of contact with contact blade 11a which latter is then pressed by a spring 11b against contact point 11c, thereby closing circuit II. Consequently, the motor and disk continue to turn in clockwise direction after push button 16 has been released that cam disk performs a full revolution of 360 degrees, thereby causing the slide conveyor 9 to move a slide from the projecting position back into the magazine, stepswitching the magazine and bringing a new slide into the projecting position. The disk cannot perform a revolution of more than 360 degrees, since, at the end thereof it comes into contact with contact blade 11a, thereby interrupting circuit II and closing circuit I, whereupon the motor turns in counter-clockwise direction without impelling driven disk 2.

A partial slide exchange, that is an exchange operation bringing back a slide from the projecting position into the magazine, is effected in the following manner: Push button 16 on remote control box 21 is actuated. Contrary to the afore-described operation, the push button must be pressed continuously, until cam 2a of disk 2 has actuated switch 10. At the start of this partial exchange operation, circuit III is closed, so that motor 1 impels disk 2. After the driven disk has performed a rotation of 180 degrees cam 2a comes into contact with contact blade 10a, urging the same contrary to the influence of spring 10b away from contact point 10c and against contact point 10d, thereby closing circuit IV and reversing the sense of rotation of motor 1. Motor 1 then turns in counter-clockwise direction without impelling disk 2 as long as switch button 16 is pressed. As soon as the latter is released, circuit II is closed, and the motor is turned in clockwise direction, impelling disk 2 until the latter has been brought into the required initial position as described supra.

The switch 17 is used as a safety circuit breaker, interrupting the electro-mechanical control in case of a disturbance or in order to enable a manual operation of the slide exchange mechanism (circuit V). By bringing contact blade 17b into contact with the second contact pair 17c, 17e, circuit V is closed, the motor is prevented from turning in clockwise direction and a direct connection is established between the current source and contact terminal for the counter-clockwise rotation of motor 1.

It will be understood that this invention is susceptible to modification in order to adapt it to different usages and conditions and, accordingly, it is desired to comprehend such modifications within this invention as may fall within the scope of the appended claims.

What we claim is:

1. In a slide projector, the combination of a reversible motor having a main terminal, a contact terminal for one sense of rotation and a contact terminal for the opposite sense of rotation, cooling means for said projector driven by said motor, a magazine for slides and movable in both directions, means for removing and returning slides to and from said magazine, and clutch means for drivingly connecting said slide changing means and said magazine advancing means to said reversible motor, with a driven disk in said clutch means being impelled in only one direction, a cam on said driven disk, a first switch and a second switch associated with said driven disk and each comprising a contact blade, a first fixed contact point and a second fixed contact point, a manually operable reversing switch, comprising a first contact point, a second contact point, and a switch contact, said contact blades of said first and said second switch being connected with said first and said second contact point, respectively, of said reversing switch, said switch contact of said reversing switch being connected with said main terminal of said reversible motor, said contact terminal for one sense of rotation of said motor being connected with said first fixed contact points of said first and said second switch, said contact terminal for the opposite sense of rotation of said motor being connected with said second fixed contact points of said first and said second switch.

2. In a slide projector, the combination as described in claim 1, further comprising a main switch for the current supply connected with said switch contact of said reversing switch and said main terminal of said motor.

3. In a slide projector, the combination as described in claim 1, further comprising a main switch for the current supply connected with said switch contact of said reversing switch and said main terminal of said motor, remote-control means, comprising said reversing switch and sand main switch.

4. In a slide projector, the combination as described in claim 1, said reversing switch comprising resiliently mounted push-button actuating means.

5. In a slide projector, the combination as described in claim 1, said first fixed contact points of said first and said second switch being connected with said contact terminal for one sense of rotation of said motor, said second fixed contact points of said first and said second switch being connected with said contact terminal for the opposite sense of rotation of said motor, resilient means urging said contact blades of said first and said second switch against said first fixed contacts, said cam on said driven disk urging said second fixed contacts against the influence of said resilient means.

6. In a slide projector, the combination as described in claim 1, said first fixed contact points of said first and said second switch being connected with said contact terminal for one sense of rotation of said motor, said second fixed contact points of said first and said second switch being connected with said contact terminal for the opposite sense of rotation of said motor, resilient means urging said contact blades of said first and said second switch against said first fixed contacts, said cam on said driven disk urging said second fixed contacts against the influence of said resilient means, said first and second switch being spaced with respect to each other by 180°, said slide changing and magazine advancing means comprising a transmission member connected with said driven disk at a point thereof spaced with respect to said cam on said driven disk by a predetermined angle so that the respective end positions of said slide changing and magazine advancing means coincide with the respective positions of said cam wherein the latter actuates said contact blades of said first and said second switch, respectively.

7. In a slide projector, the continuation as described in claim 1, further comprising a main switch for the current supply connected with said switch contact of said reversing switch and said main terminal of said motor and a safety switch for disconnecting said contact terminal for the sense of rotation of said motor impelling said driven disk from said second switch, and connecting said contact terminal for the sense of rotation of said motor not impelling said driven disk with said main switch.

No references cited.